United States Patent
Denier

(10) Patent No.: US 8,371,465 B2
(45) Date of Patent: Feb. 12, 2013

(54) ELECTRICAL BOX EXTENSION SLEEVE

(75) Inventor: Dennis J. Denier, Cincinnati, OH (US)

(73) Assignee: Denier Electric Co., Inc., Harrison, OH (US)

(*) Notice: Subject to any disclaimer, the term of this patent is extended or adjusted under 35 U.S.C. 154(b) by 899 days.

(21) Appl. No.: 11/851,640

(22) Filed: Sep. 7, 2007

(65) Prior Publication Data

US 2008/0041848 A1 Feb. 21, 2008

Related U.S. Application Data

(63) Continuation-in-part of application No. 11/685,337, filed on Mar. 13, 2007, now abandoned, which is a continuation of application No. 11/125,741, filed on May 10, 2005, now Pat. No. 7,189,928.

(60) Provisional application No. 60/659,141, filed on Mar. 7, 2005.

(51) Int. Cl.
*H02G 3/08* (2006.01)
*B65D 6/28* (2006.01)
*B65D 8/18* (2006.01)
*F16B 43/02* (2006.01)
*F16B 37/04* (2006.01)

(52) U.S. Cl. ......... 220/4.02; 220/3.4; 220/3.9; 206/722; 403/21; 411/546; 411/999

(58) Field of Classification Search .............. 220/3.4, 220/3.9, 4.02; 411/546, 999; 403/21; 206/722
See application file for complete search history.

(56) References Cited

U.S. PATENT DOCUMENTS

| | | | |
|---|---|---|---|
| 983,162 A | 1/1911 | Murray et al. | |
| 1,820,824 A | 4/1930 | Phiffer | |
| 2,378,861 A | 4/1944 | Peevey | |
| 3,187,084 A * | 6/1965 | Stillman et al. | 174/58 |
| 3,468,448 A | 9/1969 | McHollan | |
| 3,575,313 A | 4/1971 | Trachtenberg | |
| 3,770,872 A | 11/1973 | Brown | |
| 4,012,580 A | 3/1977 | Arnold | |
| 4,019,647 A | 4/1977 | Arnold | |
| 4,134,636 A | 1/1979 | Kleinatland et al. | |
| 4,328,903 A * | 5/1982 | Baars | 220/3.7 |
| 4,634,015 A * | 1/1987 | Taylor | 220/3.7 |
| 5,042,673 A | 8/1991 | McShane | |
| 5,550,322 A | 8/1996 | Tynan | |
| 5,639,991 A | 6/1997 | Schuette | |
| 5,736,674 A | 4/1998 | Gretz | |
| 5,837,936 A * | 11/1998 | Rogers et al. | 174/650 |
| 5,931,325 A | 8/1999 | Filipov | |
| 5,975,323 A | 11/1999 | Turan | |
| 6,180,879 B1 | 1/2001 | Gretz | |
| 6,204,447 B1 | 3/2001 | Gretz | |

(Continued)

FOREIGN PATENT DOCUMENTS

GB    2 276 983 A    10/1994

*Primary Examiner* — Anthony Stashick
*Assistant Examiner* — Andrew T Kirsch
(74) *Attorney, Agent, or Firm* — Wood, Herron & Evans, LLP

(57) ABSTRACT

A drywall extension sleeve for an electrical box includes a rectangular sleeve with upper and lower flanges. The extension box preferably has an outer dimension that mates with a drywall ring or box. The sleeve is preferably attached to a pre-wired assembly, which includes an electric cable and electrical box, drywall ring and the electrical component wired to the cable. The extension sleeve is positioned between the drywall ring or box and the electrical component. The electrical assembly is installed and drywall is then attached to the framed-in wall. An opening is provided through the drywall for the electrical component. The electrical component is then loosened and the extension sleeve and electrical component moved outwardly. Retention clips are placed in upper and lower flanges of the extension sleeve and the electrical component is tightened, drawing the extension and the component flush against the outer surface of the drywall.

6 Claims, 5 Drawing Sheets

U.S. PATENT DOCUMENTS

| | | |
|---|---|---|
| 6,307,154 B1 | 10/2001 | Gretz |
| 6,369,322 B1 | 4/2002 | Gretz |
| 6,403,883 B1 | 6/2002 | Morgan et al. |
| 6,509,524 B1 | 1/2003 | Gretz |
| 6,573,446 B1 | 6/2003 | Umstead et al. |
| 6,777,615 B1 | 8/2004 | Gretz |
| 6,875,922 B1 | 4/2005 | Petak et al. |
| 7,038,561 B2 | 5/2006 | Esty |
| 2003/0014939 A1 | 1/2003 | DeWall |

* cited by examiner

ELECTRICAL BOX EXTENSION SLEEVE

RELATED APPLICATIONS

This application is a continuation-in-part of U.S. patent application Ser. No. 11/685,337, filed on Mar. 13, 2007, which is a continuation of U.S. patent application Ser. No. 11/125,741, filed on May 10, 2005 (now U.S. Pat. No. 7,189,928), which is a regular utility application of U.S. Provisional Patent Application Ser. No. 60/659,141, filed on Mar. 7, 2005. The entire disclosures of these applications and U.S. Pat. No. 7,189,928 are incorporated herein by reference.

BACKGROUND OF THE INVENTION

Traditionally, electrical wiring has been installed by electricians one element at a time. In other words, the individual wires were run through the stud walls. These wires were then attached to electrical boxes mounted on studs or other supports such as mounting brackets. The individual electrical components, such as the switches and the outlets were then attached to the wiring in the boxes, and screwed into the box. The drywall would be installed over this, and an opening cut, either before or after installation of the drywall, to allow access to the electrical component.

In order to improve efficiency, factory-prepared, pre-wired assemblies are being utilized. Thus, when a commercial or residential building is wired, the components are pre-assembled in a factory. Such assemblies can include, for example, the electrical components, attached with a drywall ring to a box. Typically, any drywall ears are removed from the electrical component. The box may be attached to a mounting bracket. The actual wire, usually in the form of metal clad or NM cable, is also pre-attached to the box and connected to the electrical component. The electrician attaches the bracket at the appropriate location, runs the cable up through the wall, and attaches it to the next assembly. This greatly reduces the electrician's time, which is a major expense in wiring a building.

The electrical component, either the switch or the duplex outlet, should be flush with the outer surface of the drywall. Typically, the drywall is ⅝-inch to ½-inch thick. However, thicker drywall can be employed. A double thickness of drywall can be used to provide a greater fire rating. In these embodiments, the drywall ring would not place the electrical component flush with the outer surface of the drywall.

To deal with these situations, the electrician must remove the electrical component, insert an electrical box extension, and reinsert the component. The electrical box extension is basically a rectangular sleeve with upper and lower flanges that engage the surface of the drywall. The electrical component is then attached via screws to the drywall ring with the extension between the component and the ring. Tightening the electrical component makes it flush with the outer surface of the drywall. This works, but it requires a great deal of electrician time.

Frequently, the electrical box will not be properly positioned. This can prevent the electrical component from being flush with the drywall, thus creating a possible unsafe condition.

SUMMARY OF THE INVENTION

The present invention is premised on the realization that an electrical box extension sleeve that has a size that permits it to fit within the raised portion of a drywall ring, can be added as part of an electrical assembly and utilized when necessary.

The electrical box extension sleeve is used with movable retention tabs on the extender. The tabs are designed to move from a position where they cannot engage the drywall to a position wherein they can engage the drywall. If not needed, the extension sleeve remains in the wiring assembly between the component and drywall ring or electrical box if there is no drywall ring. If needed, the extension sleeve and electrical component are moved outwardly and the tabs positioned to engage the drywall. The extension sleeve is pulled back into the unit until the tabs engage in the drywall. Thus, these can be used in pre-assembled wiring assemblies and utilized only when needed. They can be located in an appropriate position when needed without removing the electrical component. They can be used to compensate for increased thickness of drywall or to level an electrical component with the surface of the drywall.

Preferably, the extension sleeve has an outer dimension that mates with the inner dimension of a drywall ring or electrical box if there is no drywall ring. This eliminates any gap between the electrical component and drywall. This reduces the possibility of a fire caused by arc flashing, should a component fail.

Other objects and advantages of the present invention will be further appreciated in light of the detailed description and drawings, in which:

DETAILED DESCRIPTION OF THE DRAWINGS

Figure 2:
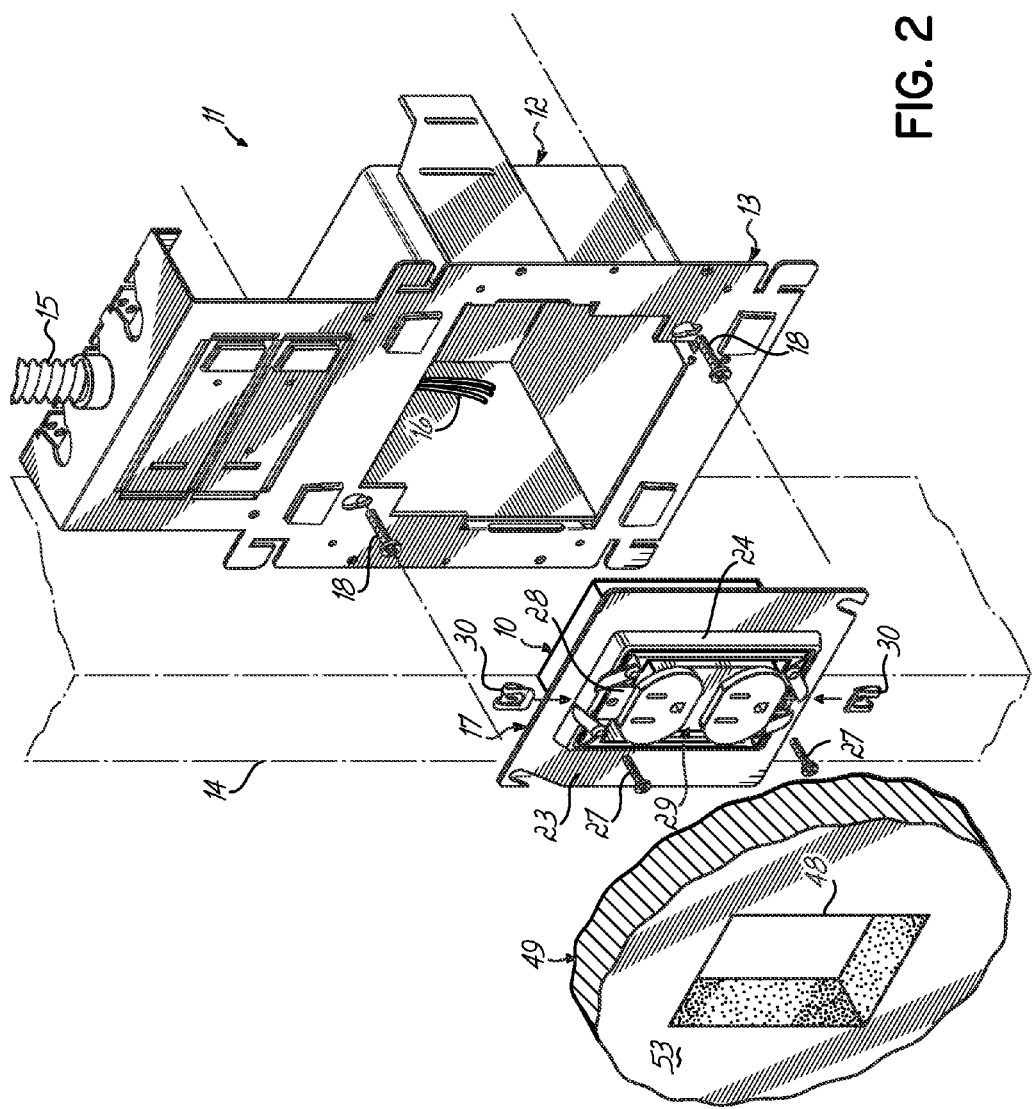
FIG. 2 is an exploded perspective view of the embodiment shown in FIG. 1A showing the electrical component, extension sleeve and drywall ring.

The present invention is an extension sleeve 10 for use in an electrical assembly 11. An electrical assembly 11 will include an electrical box 12 with electric cable 15 attached to the box with wires 16 running into the box 12 and attached to an electrical component 29 such as a switch or a duplex outlet, or a plurality of such electrical components, i.e., multiple switches or outlets in a single box. As shown in FIG. 2, the electrical assembly 11 includes an electrical box 12 which is attached to a mounting bracket 13 designed to attach to stud 14.

As shown, a drywall ring 17 is attached with screws 18 to the electrical box 12. The drywall ring 17 includes a peripheral portion 23 and a raised portion 24. Extended from the raised portion 24 are tabs 25 which each include a threaded screw hole 26.

Adjacent the interior edge of drywall ring 17 is the extension sleeve 10, which is held in position with the mounting screws 27 that extend through the mounting tabs 28 of an electrical component 29. These mounting screws 27 extend through the mounting tabs 28 of the duplex outlet 29 through unthreaded holes 31 in either ends or flanges 41,42 of the extension sleeve 10 and, finally, into the threaded holes 26 in tabs 25 of the drywall ring. Electrical component engaging members or retention clips 30 fasten on either side of flanges 41,42 with holes 26 centered with opening 32 and the head 34 of screw 27. Opening 32 holds the head 34 in position and allows one to engage and rotate head 34, causing the extension to raise and lower with electrical component 29.

The drywall ring 17 may be omitted. In that situation, the extension sleeve 10 would be sized to fit within the electrical box and the electrical component would attach directly to the box.

Preferably, the extension sleeve 10 is a continuous hollow sleeve. It includes two opposed walls 35 and 36, and upper and lower short walls 37 and 38. Walls 37 and 38 include scalloped portions 39 and 40 to mate with the interior edge 17(a) of drywall ring 17. Thus, the scalloped portions 39 and 40 provide clearance between the walls 37 and 38 and tabs 25.

Preferably, there will be minimal clearance between the extension sleeve 10 and the interior edge of drywall ring 17. This clearance should be less than ⅛ inch, and preferably, less than 1/16 inch or less, to minimize the risk of fire from arc flashing. If arc flashing is not a concern, the clearance can be greater.

Figure 3:
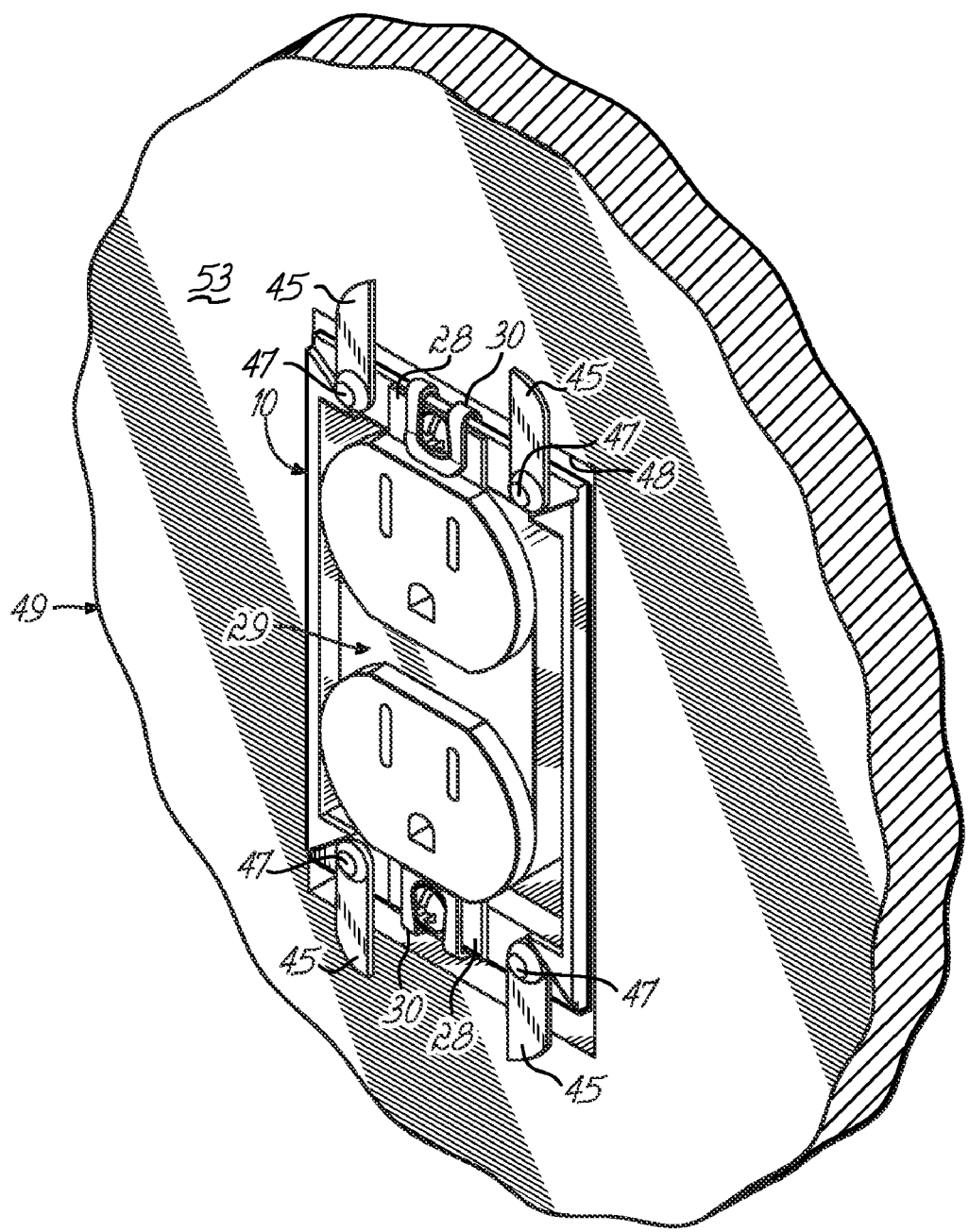
FIG. 3 is a perspective view of the embodiment shown in FIG. 1A with drywall.

Leveling tabs 45 are affixed to flanges 41 and 42 by rivets 47. The rivets permit the tabs to rotate relative to the flanges 41 and 42 from a non-drywall engaging position to a position where they would engage the drywall as shown in FIG. 3.

The extension sleeve 10 rests within the drywall ring 17 with holes in Flanges 41 and 42 aligned with holes 26 in the drywall ring 17. The holes in Flanges 41 and 42 are approximately 3.25 inches on center for applications in the United States market. Generally, the depth of the extension sleeve will be ⅛ to 2 inches, more preferably ¼ to 1½ inches.

The extension sleeve 10 is included in a pre-wired assembly 11 which is installed in a framed wall prior to drywall installation. A pre-wired assembly 11 will include the electrical component 29, generally a duplex outlet or a switch (without drywall ears), which is wired to cable 15, which is attached to the electrical box 12. This will preferably include a mounting bracket 13 and a drywall ring 17 with the bracket 13 mounted between the box 12 and the drywall ring 17. There are many different mounting brackets. Some mount to a stud, others mount to the floor. The particular bracket 13 shown in the figures is described more particularly in pending U.S. application Ser. No. 10/888,858, filed Jul. 9, 2004, the disclosure of which is incorporated herein by reference.

This assembly 11 is delivered to the job site for the electrician to install. The electrician will simply mount the bracket 13 to the desired location. Or, if an electrical box 12 is employed without a bracket, mount the electrical box directly to the intended location such as a stud, or the like. The electrician then connects cable 15 as required. Drywall 49 is installed directly over the drywall ring 17. A router or saw is used to cut a hole 48 through the drywall 49 to allow the raised portion 24 of ring 17 to extend through the drywall 49. This will, in turn, expose the electrical component 29. If the electrical component 29 is flush with the outer surface 53 of the drywall 49, the extension sleeve 10 is not extended. The extension sleeve 10 merely acts as a shield between the drywall and electrical component 29.

However, if the surface of the electrical component 29 is within the drywall 49 and needs to be pulled out to compensate for thicker drywall or to level the component with the drywall surface, the mounting screws 27 are counter rotated drawing the screw 27, clip 30 and sleeve 10 out. Tabs 45 are rotated approximately 90° so that they extend away from sleeve 10. In this position, tabs 45 will contact the surface 53 of the drywall. The screws 27 on the electrical component are then tightened, until tabs 45 contact surface 53 thus making the surface of the electrical component 29 flush with surface 53 of drywall 49. A cover plate (not shown) is then installed over the electrical component 29 and extension sleeve 10.

Preferably, the extension sleeve will be used in all situations as a means to eliminate any gap between the drywall ring 17 or electrical box 12 and the drywall 49. This will reduce the risk of fire caused by arc flashing. In effect, the sleeve will act as a shield between the electric component and the drywall, thus creating a safer condition.

The extension sleeve 10 can be formed from metal or plastic, with plastic being preferred. The plastic can be fire rated, if desired.

Figure 1A:
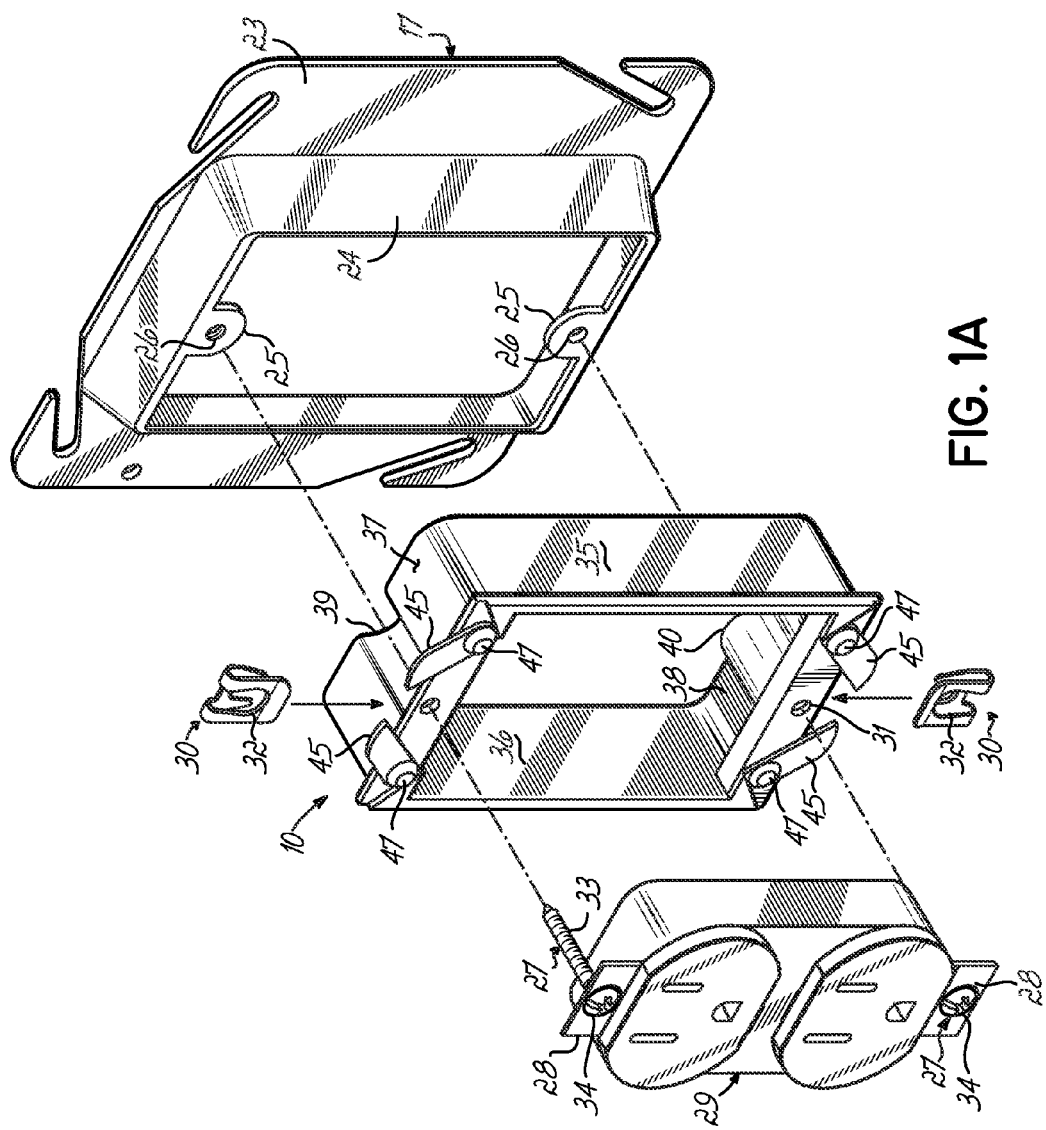
FIG. 1A is an exploded view of a first embodiment of the present invention.
Figure 1B:
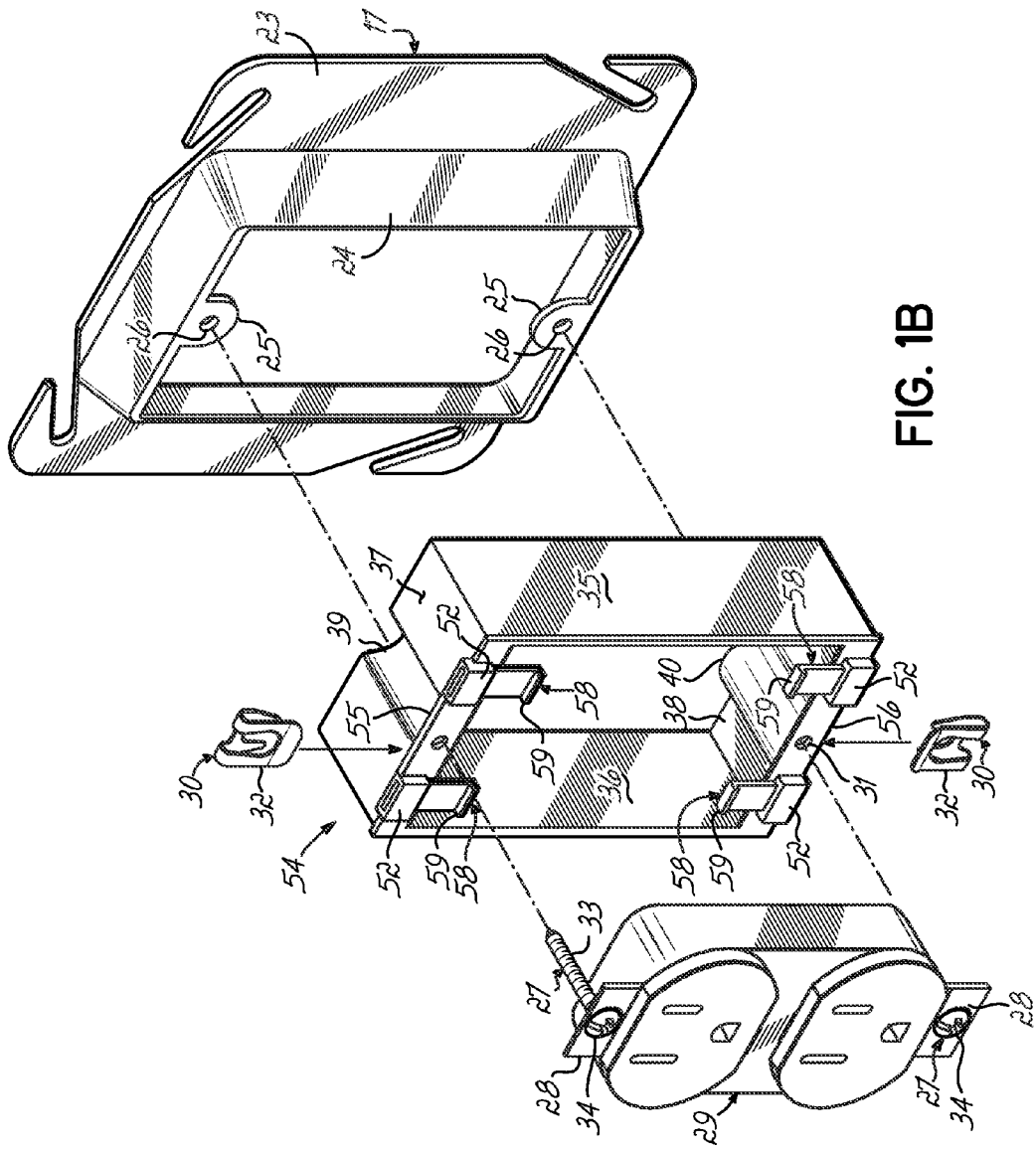
FIG. 1B is an exploded view of a second embodiment of the present invention.

A second embodiment of the present invention is shown in FIG. 1B. In this embodiment the extension sleeve 54 similar to extension sleeve 10 includes flanges 55 and 56. Each flange includes two sleeves 52 which slidably hold tabs 58 within the sleeves 52. Sleeves 52 extend perpendicular to flanges 55 and 56. The tabs 58 are simply rectangular tabs with an enlarged end portion 59, which prevents the end portion from extending through the sleeves 52.

Extension sleeve 54 is used in the same manner as the extension sleeve 10. In order to compensate for drywall thickness and level the electrical component 29 with the drywall surface, the mounting screws 27 are counter rotated causing screw 27 and clip 30 and sleeve 54 to back out. Tabs 58 are then pushed through sleeves 52 so that they extend outwardly beyond the edges of flanges 55 and 56 to a drywall engaging position. Screws 27 are rotated to tighten the component pulling the extension sleeve 54 toward drywall 49 until the tabs 58 engage the surface 53 of drywall 49, thus leveling the extension sleeve and the electrical component 29.

Figure 1C:
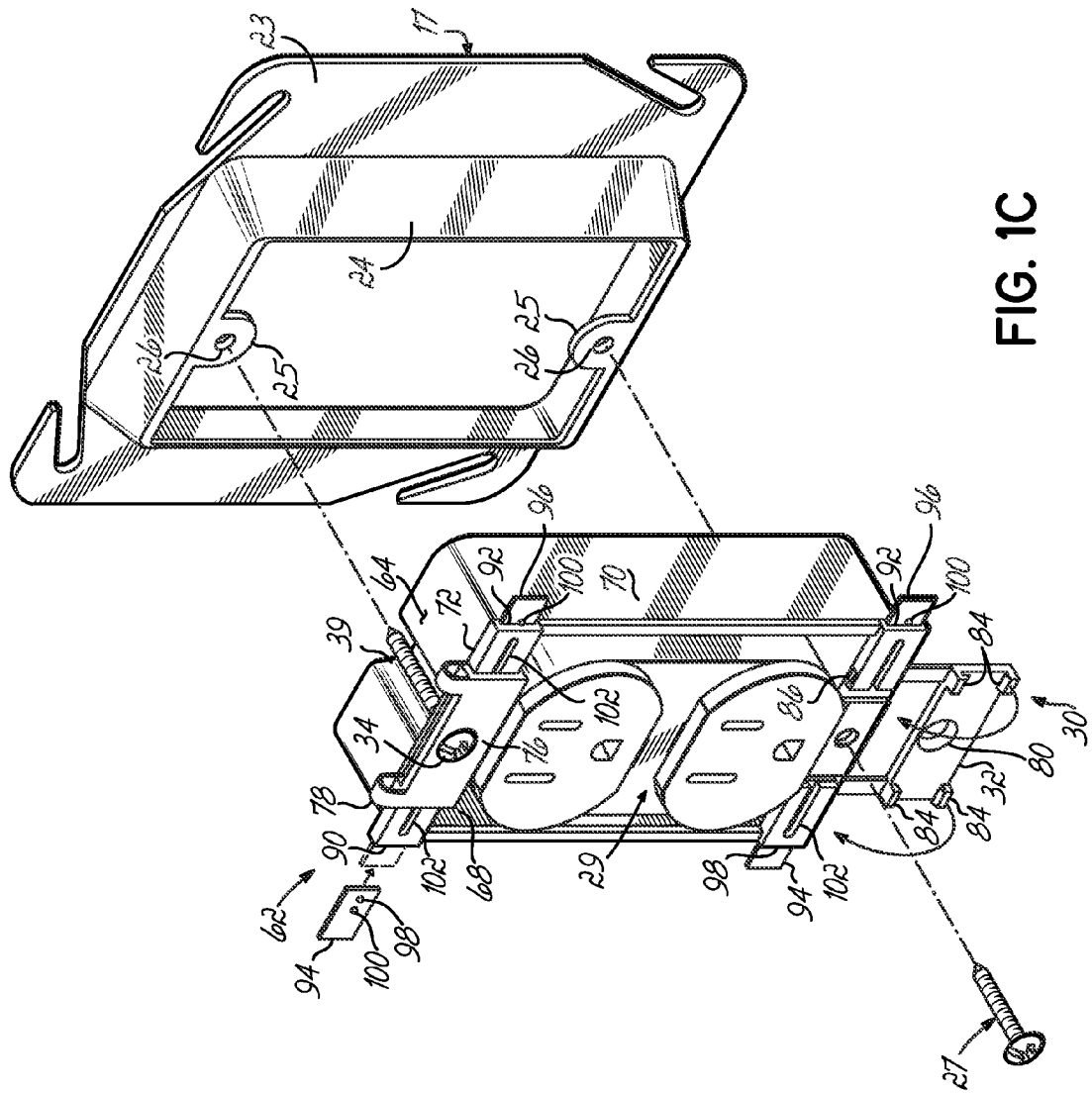
FIG. 1C is an exploded view of a third embodiment of the present invention.

A third embodiment of the present invention is shown in FIG. 1C. In this embodiment, the extension sleeve 62 includes first and second narrow walls 64 and 66 and elongated side walls 68 and 70. Flanges 72 and 74 extend from the first and second narrow walls 64 and 66.

First and second electrical component engaging member or cover member 76 is attached to the flanges by flexible straps 78. The cover member 76 includes a central hole 80 that will align with the head of the mounting screw 27 of electrical component 29. Cover member 76 includes four prongs 84 adapted to snap fit into indentations 86 on the sides 88 of the flanges 72 and 74.

Each flange 72,74 further includes two lateral sleeves 90,92 having tabs 94,96 slidable within the sleeves 90,92. Sleeves 90,92 extend parallel to flanges 72,74. Each tab has a first and second nub or raised portion 98,100. A first raised portion 98 rides in a channel 102 in the sleeves 90,92.

When assembled with the extension sleeve 62 positioned within an electrical box 12 holding an electrical component 29, the cover members 76 are snap fitted over the ends of the electrical component 29 with the hole 80 allowing one to access the heads of the mounting screws 27 in the component 29. The hole 80 has a diameter somewhat smaller than the head 34 so that when the screw 27 is backed out it pulls the electrical component 29 and the extension sleeve 62 with it. When the extension sleeve 62 is leveled with the drywall surface or is backed out slightly beyond the surface of drywall, the tabs 94,96 are extended laterally and the screw 27 rotated to pull the component 29 back towards the drywall until the tabs 94,96 contact the drywall. Thus, the electrical component 29 will be flush with the exterior surface of the drywall.

With any of these extension sleeves 10, 54 or 62, the extension sleeve, with the tabs attached to the flanges can be installed in an electrical assembly prior to installation. When in a disengaged position the tabs do not contact the drywall. Thus, the electrical assemblies can be shipped as a unit with the extension sleeve including the tabs. The installer does not have to locate a separate tab or clip to insert during installation. The electrical extension sleeves of the present invention simplify installation of pre-wired assemblies. The extension sleeve can be part of the pre-wired assembly so that when brought to the construction site one can guarantee that the outer surface of the electrical component will be flush with the outer surface of the drywall. The use of this device reduces the time required to install electrical assemblies. The expense of adding the extension sleeve to the pre-wired assembly is more than offset by the savings in installation costs. Use of this product also reduces fire risk and improves quality.

This has been a description of the present invention along with the preferred method of practicing the present invention. However, the invention itself should only be defined by the appended claims.

What is claimed is:

1. A pre-wired electrical assembly comprising an electrical box, an electrical component attached to said electrical box or a drywall ring attached to said electrical box, said electrical component having first and second electrical component tabs and wired to an electrical conductor attached to said electrical box;
    an electrical box extension having first and second flanges, said extension mounted to said assembly between said electrical component and said box with first and second mounting screws extending through said electrical component tabs and said flanges in said extension fixing said extension and said component to said electrical box or a drywall ring attached to said electrical box;
    fasteners holding heads of said screws between said fasteners and said flanges in said extension said fasteners having openings allowing access to said heads of said mounting screws thereby allowing said mounting screws to be rotated whereby rotation of said mounting screws causes said extension to move relative to said electrical box; and
    drywall engaging members movable from a non-drywall engaging position to a drywall engaging position.

2. The pre-wired electrical assembly claimed in claim 1 wherein said drywall engaging members comprise tabs fixed to said first and second flanges wherein said tabs rotate from said non-drywall engaging position to said drywall engaging position.

3. The pre-wired assembly claimed in claim 1 wherein said drywall engaging members comprise tabs in sleeves on said first and second flanges, said tabs slidable from said non-drywall engaging position to said drywall engaging position.

4. The pre-wired assembly claimed in claim 1 wherein said fasteners comprise first and second cover members attached to said first and second flanges each cover having a hole centered over heads of said first and second mounting screws, said holes being smaller than the heads of said mounting screws.

5. An electrical assembly comprising an electrical box, an electrical component attached to said electrical box or a drywall ring attached to said electrical box by first and second mounting screws extended through first and second mounting flanges of said electrical component;
    an electrical box extension having first and second flanges at first and second ends of said extension, said extension mounted to said assembly between said electrical component and said box;
    fasteners holding heads of said mounting screws between said fasteners and said mounting flanges, and holding said mounting flanges to said extension, said fasteners having openings allowing access to said heads of said mounting screws, whereby rotation of said mounting screws moves said extension box and said electrical component relative to said electrical box;
    drywall engaging members adapted to be pressed against drywall to locate said electrical component flush with a surface of said drywall.

6. The electrical assembly claimed in claim 5 wherein said extension box includes first and second flanges at said first and second ends and wherein said first and second flanges of said extension box engage said mounting flanges of said electrical component.

* * * * *